Patented Feb. 22, 1927.                                                  1,618,883

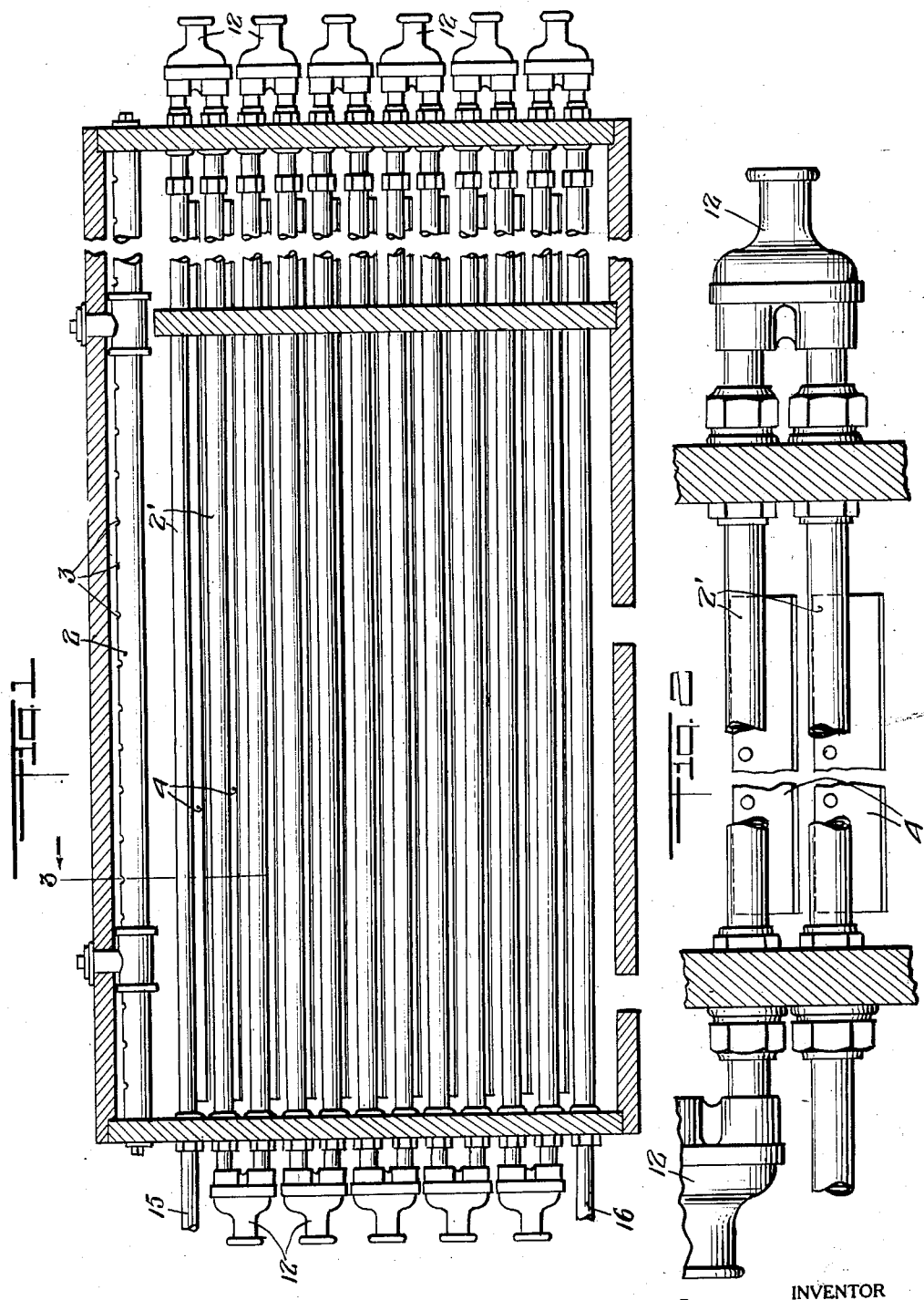

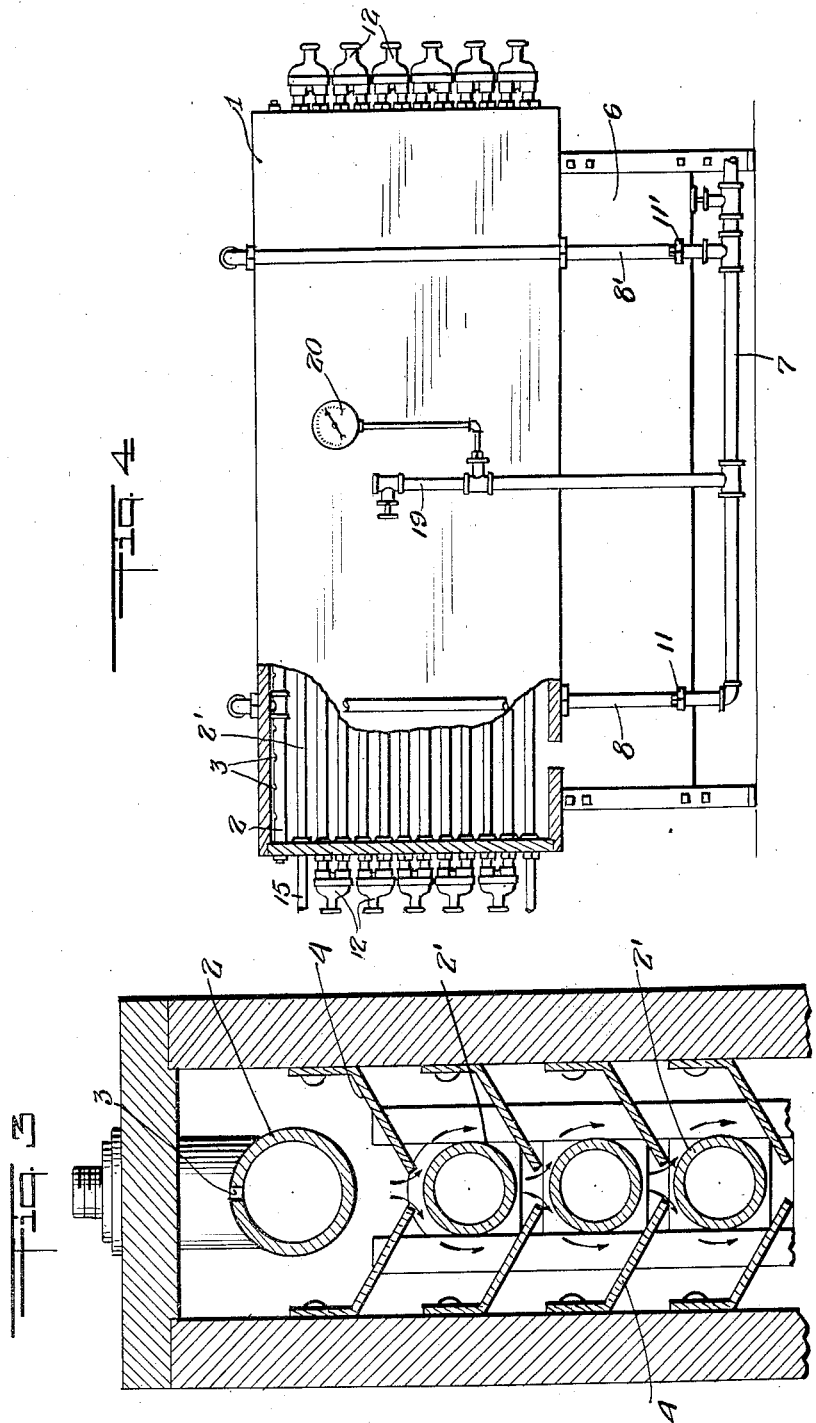

UNITED STATES PATENT OFFICE.

IRA H. KENDALL, OF POTSDAM, NEW YORK.

METHOD OF AND APPARATUS FOR PREHEATING MILK.

Application filed October 30, 1924. Serial No. 746,762.

My invention relates to a new and improved method of and a new and improved apparatus for preheating milk and like fluids.

One of the objects of my invention is to provide a new and improved method of and apparatus for preheating milk without injuring the qualities thereof, to a temperature which is higher than has heretofore been found possible.

Another object of my invention is to provide a method of and an apparatus for heating a body of milk which is kept in movement, by imparting to the said milk the heat from a separate moving body of heating liquid so that the heating liquid can be removed from the zone of heating before the flow of the milk in said zone of heating is stopped.

Another object of my invention is to provide a new and improved method of and apparatus for preheating milk for making condensed milk which will obviate the necessity of using "hot wells" and similar apparatus.

Other objects of my invention will be set forth in the following description and drawings which illustrate a preferred embodiment thereof, it being understood that the general purposes above mentioned are merely for a general explanation thereof and not to limit the said invention.

Fig. 1 is a sectional view partly in elevation and illustrates the heater forming a part of my apparatus.

Fig. 2 is a sectional view partially in elevation showing the connections of the milk pipes and showing other details of construction.

Fig. 3 is a sectional view of the heater.

Fig. 4 is a diagrammatic general view of the entire apparatus.

In order to preheat milk in the process of making condensed milk, and before the milk is led into the evaporating apparatus, the method most commonly used at the present time is to heat the milk by injecting live steam therein while the milk is in a large receptacle called a hot well. Although this raises the temperature of the milk, the steam condenses and dilutes the milk to about 10% to 15%. As this condensed water must be evaporated in the process of making the condensed milk, this causes a large increase in the time and cost of operation.

It has also been proposed to pass the milk through a coil of piping immersed in a tank of water which is suitably heated. Apparatus of this type, however, has not been satisfactory because if the milk was raised to a sufficiently high temperature it scorched upon the interior walls of these heated metal pipes, producing a film. This scorching not only imparted an objectionable taste to the milk but the film thus produced was a good heat insulator so that the rapid heating of the milk was retarded. It also was necessary to remove the scorched film before mentioned and this required much time, labor and expense. It has been proposed to pass the milk through the heated piping with great rapidity so as to obviate this scorching but this expedient has not proved successful.

I have found that the reason for the scorching is due to the fact that these preheating devices are of necessity intermittently operated in the operation of an ordinary milk condensing plant so that the scorching effect and the formation of the film is produced when the milk is stationary in the heated metal pipes.

According to my invention the piping through which the milk is pumped is not constantly immersed in the heating liquid but it is heated by a moving layer, film or body of heated liquid. Hence, before the flow of the milk in the piping is stopped, the flow of the heating liquid in the zone of heating can be stopped and the flow of the milk in the piping can then be continued with the constant admission of fresh cold milk until the temperature of the milk in the piping is below the point at which any scorching can take place.

As shown in Figs. 3 and 4, the milk is heated while it is pumped through a series of pipes 2', the milk being pumped in through the inlet pipe 16 and out through the outlet pipe 15. The heater 1 has at the top thereof a distributor pipe 2 having a series of perforations 3 at the top thereof so that if a heating liquid such as water is forced into the distributor pipe 2, the said heating liquid will be uniformly distributed and will flow over the pipe 2 in the form of a thin uniform layer.

A series of baffle plates 4 are provided which retard the flow of the hot water and cause the hot water to pass around the successive pipes 2' in the form of a thin and uniform layer. The pipes 2' are connected by couplings 12 of any suitable type.

As shown in Fig. 4 the heater 1 is mounted above the hot water tank 6 and there is an outlet at the bottom of the heater 1 for the hot water so that if no more hot water is forced into the pipe 2, all the hot water in the heater 1 can rapidly drain out therefrom and pass into the bottom tank 6. As can be seen in Fig. 4, a pipe 7 is located adjacent tank 6 and this is connected by upright pipes 8 and 8' with the distributor pipe 2. In order to force the water through the upright pipes 8 and 8' into the distributor pipe 2, ordinary ejectors 11 and 11' can be utilized. Steam under suitable pressure from any suitable source is forced in through the inlet pipe 19 which is provided with an ordinary gauge 20. The injected steam circulates and heats the water. Each ejector 11 and 11' has a horizontal pipe connecting it with the water in tank 6. Hence when steam is forced under pressure into pipe 19, the steam flows in pipe 7 and then upwardly into ejectors 11 and 11' so that the water is heated and raised in pipes 8 and 8' to pipe 2.

When in the operation of the plant it is necessary to stop the flow of milk into the evaporating apparatus, it is necessary to first shut off the steam fed to the ejectors 11 and 11' so that the flow of hot water into the pipe 2 is stopped. In a few seconds all the hot water in the heater 1 will have drained into the bottom of tank 6. During this period fresh cold milk is forced in through the inlet pipe 16 if desired, so that the temperature of the milk in the pipes 2' falls below the point at which scorching will take place. It will be noted that the cold milk enters at the bottom of the zone of heating while the heating liquid enters at the top thereof, so that the milk and the heating liquid flow in opposite directions.

Practical tests have shown that the use of the improved method and apparatus above mentioned produces an economy of about 15% in the time and expense necessary for condensing milk.

I claim:—

1. A method of preheating milk or the like prior to the concentration thereof which consists in causing it to flow intermittently through a zone of heating, and causing a heating liquid to also flow intermittently through said zone of heating, the said milk being caused to absorb heat from said liquid in said zone of heating substantially only while said milk is flowing, so that while said milk is stationary, it is substantially protected from a rise in temperature which would cause the scorching thereof.

2. A method according to claim 1 in which the flow of the heating liquid through said zone is discontinued before the flow of the milk through said zone is discontinued.

3. A method according to claim 1 in which the flow of the heating liquid through said zone is discontinued before the flow of the milk through said zone is discontinued, and in which the heating liquid is also removed from said zone of heating before the flow of the milk is discontinued.

4. A method according to claim 1 in which the flow of the heating liquid through said zone is discontinued before the flow of the milk through said zone is discontinued, and in which the flow of the milk is then further continued with the constant addition of cold milk, the heating liquid in said zone also being removed therefrom, until the milk in said zone is below the temperature at which a cooked taste can substantially develop.

5. An apparatus for heating milk or the like comprising a casing having piping therein adapted to have milk pumped through it, a hot water reservoir connected to the bottom of the said casing, and means adapted to force the hot water from the said reservoir into the said casing to flow back to the said hot water reservoir after having contacted with the said piping, whereby the water in the said casing drains into the said reservoir after the supply thereof to the said casing has been discontinued.

6. An apparatus for heating milk or the like comprising a casing having piping therein adapted to have milk pumped through it, a hot water reservoir connected to the bottom of the casing, a pipe connecting said reservoir to the upper part of said casing, a steam injector connected to said pipe and adapted to raise water from said reservoir into said casing, said reservoir having a capacity greater than said casing, so that substantially all the water in said casing can drain into said reservoir when the action of the injector is discontinued.

In testimony whereof I hereunto affix my signature.

IRA H. KENDALL.